(12) United States Patent  
Norman et al.

(10) Patent No.: US 8,489,089 B1  
(45) Date of Patent: Jul. 16, 2013

(54) HUMAN-READABLE, SEMI-PERSISTENT OVERLAY THAT DYNAMICALLY DISPLAYS A CHANGEABLE OPERATIONAL STATE OF A RADIO BASE STATION

(75) Inventors: Mårten Norman, Spånga (SE); Marie Sparr, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/365,426

(22) Filed: Feb. 3, 2012

(51) Int. Cl.
*H04W 24/00* (2009.01)

(52) U.S. Cl.
USPC .......................................... 455/424

(58) Field of Classification Search
USPC ........... 455/67.11, 450, 509, 424, 323, 456.3, 455/466, 518, 419; 717/170; 714/4.1; 701/438; 711/103; 370/311, 329; 709/203, 224, 225
See application file for complete search history.

(56) References Cited

U.S. PATENT DOCUMENTS

| | | | |
|---|---|---|---|
| 6,120,588 A | 9/2000 | Jacobson | |
| 6,924,781 B1 | 8/2005 | Gelbman | |
| 7,167,155 B1 | 1/2007 | Albert et al. | |
| 2008/0121246 A1 | 5/2008 | Saito et al. | |
| 2008/0320464 A1* | 12/2008 | Wahlstrom et al. | 717/170 |
| 2009/0117852 A1* | 5/2009 | Loh | 455/67.11 |
| 2010/0308794 A1* | 12/2010 | Townsend et al. | 324/103 P |
| 2011/0223924 A1* | 9/2011 | Lohr et al. | 455/450 |

OTHER PUBLICATIONS

DotMatrix™ bistable display technology; retrieved from http://www.pricer.com/ website May 2011.
Pricer Video Poster; retrieved from http:www.pricer.com/ website May 2011.
Software and Infrastructure; retrieved from http://www.pricer.com/ website May 2011.

* cited by examiner

*Primary Examiner* — Kiet Doan
(74) *Attorney, Agent, or Firm* — Nixon & Vanderhye P.C.

(57) ABSTRACT

A radio base station for performing radio communication functions includes a human-readable, semi-persistent overlay fixed to a surface of the radio base station. A nonvolatile memory stores a current operational state of the radio base station. The human-readable, semi-persistent overlay indicates at least with text characters or symbols on the current state. If the current state of the radio base station changes, then the text characters or symbols on the human-readable, semi-persistent overlay are updated to reflect the changed state. The indication of the changed radio base station state on the human-readable, semi-persistent overlay remains human-readable even if the radio base station is powered-down.

20 Claims, 7 Drawing Sheets

HUMAN-READABLE, SEMI-PERSISTENT OVERLAY THAT DYNAMICALLY DISPLAYS A CHANGEABLE OPERATIONAL STATE OF A RADIO BASE STATION

TECHNICAL FIELD

The technology relates to an overlay for a radio base station human interface.

BACKGROUND

Radio base stations used in radio communications, e.g., cellular, WiFi, etc., are programmable or configurable and include control electronics. Base stations also typically use software programs executed by a computer along with reconfigurable hardware like Field Programmable Gate Arrays (FPGAs). Base stations can often operate in more than one mode and/or support more than one type of radio access technology, e.g., radio circuits dedicated for GSM and LTE modulations. As a result, base stations may be flexibly and generically designed so that they can later be tailored for a specific environment, technology, mode of operation, etc. This is the case for radio base station (RBS) "connectors."

RBS connectors are used for interconnecting parts of the base station, sometimes referred to as RBS sub-units, connecting the base station to other node(s) in the cellular system over a transport network, and/or connecting/controlling local equipment like climate systems, burglar alarms, and backup power. The connectors are often "generic" in that they are (re)configurable. A generic connector can be (re)configured using software or hardware. A software example is an Ethernet connector that allows connection with a base station service engineer's laptop or with Radio Network Controller (RNC). The connector and the Ethernet chip do not change, but the specific configuration of software and/or settings in the base station and the device being connected to the base station determines whether the base station and that device are compatible to connect or not. A base station connector may also be associated with programmable hardware, for example, connector circuits that may change between ATM-STM-1 mode and Ethernet according to RBS software and/or settings. Such hardware circuits may also be combined using an adapter plug that changes the properties of the physical connector. Small Form-factor Pluggable (SFP) is one known standard adapter allowing electrical and optical cables to be connected to an SFP slot using a suitable SFP adapter module. In any event, a generic RBS connector is made specific by programming/configuring it for a specific use. Non-limiting examples of specific base station connectors and/or connectors on base station sub units include power supplies (with specified voltage and/or current properties), antenna connectors (with requirements to connect the proper antennas to achieve intended radio coverage and performance), radio connectors that are used for example in accordance with the CPRI standard to connect baseband unit(s) to radio units, and an RBS interconnect that couples clock signals, data signals, and control signals between (sub)units in large RBSs.

But this flexible RBS connector configuration can lead to errors. For example, a base station site engineer must consult several sources in order to learn where a cable is to be connected in a generic base station if there is no indication as to what that connector is currently programmed to do. So if a base station is generically configured when it is initially put into service, and then reprogrammed by the system into a special operation or role, there is no way for the site engineer to know, without consulting a secondary source: (1) how the base station is currently configured, (2) if the base station is configured as expected, and (3) what connectors to connect. Generically-configured base station units also increase the risk for human errors in a repair context because it may be difficult for a repair person to examine a base station unit and immediately see its current configuration. Without an easily-readable indicator that a base station unit is faulty, there is a risk that faulty and working base station units are mixed by mistake.

Consider a base station power supply unit with a configurable maximum current where it is desirable to have that maximum current visible on the unit. It is possible to simply print the fixed maximum current directly on the unit, but this is not a good option for a configurable unit where the maximum current may be reconfigured to a different value. While a powered display attached to or near the unit could be used to display the currently-configured maximum current, it would be beneficial to provide that same information to a human in a non-volatile way, i.e., where the current value is readable even when power is off, without either physically updating, e.g., by replacing or printing, the overlay or by adding some kind of battery backup.

Another example is where an operator has a radio base station with a 20 W transmitter for which it is possible to upgrade the base station to an 80 W transmitter. In order to support the upgrade, the maximum current to the transmitter must also be increased. Even though the entire base station upgrade operation can be performed remotely, there is no visible indication on the transmitter and power unit of the upgraded base station of the increased power and current.

One way of increasing flexibility of generically-configured base station units while at the same time guiding human operators regarding specific configurations for base station connectors and informing repair personnel is through the use of overlays. An overlay is printed text and/or symbols around a human input or output indicator like connectors, lamps, displays, knobs, and buttons on the base station, typically on a base station console. An overlay helps a human to identify the use for a human input or output and to interpret the status of the base station such as identifying which connector to plug in, which button to push, etc. An overlay is typically a printed paper or clear sheet mounted on the base station console or panel with text/symbols printed thereon or text/symbols may be printed directly on the console or panel.

Unfortunately, traditional overlay approaches require updating or changing the overlay for a base station unit, and thus, require some sort of mechanical work and/or manufacturing to provide a new overlay. For example, if a base station is reconfigured using software, the old, out-of-date overlay (text/images) for the old software configuration remains until someone prints a new overlay and physically mounts it on the base station. This is a significant disadvantage when the radio base station is located 500 km away and is operated remotely. In this case, even if the update or change of the base station can be performed over a data connection from a control center, that does not change the printed text on the overlay(s) on that base station.

SUMMARY

A radio base station unit includes radio transceiving circuitry coupled to one or more antennas, a memory, a controller, and a user interface console that includes multiple input and output indicators, e.g., associated with base station connectors. A current operational state associated with the base station is stored in the memory. That current state is indicated at least with text characters or symbols on a human-readable, semi-persistent overlay provided on a surface of the base station, e.g., on a user interface console. One non-limiting example of a human-readable, semi-persistent overlay is a non-volatile electronic ink overlay. Subsequently, the current state associated with the base station changes, and if desired, the changed base station state is stored in the memory. The text characters or symbols on the human-readable, semi-persistent overlay are automatically updated to reflect the changed state associated with the base station. The indication of the changed state on the human-readable, semi-persistent overlay is maintained to indicate the changed state associated with the base station, which is human-readable even if the unit is powered-down. The overlay indication is maintained even when a previous attempt to change the indication of the current state associated with the base station fails.

In a non-limiting example embodiment, the current base station state is changed using a local management terminal or a remote management terminal in communication with the base station. Another option is to receive the changed current base station state from an external entity or an internal entity.

Examples of a base station operational state might relate to a connector, button, knob, or port of the base station; one or more radio access technology (RATs) that the base station currently can support; number of currently operational radio transceivers; number of currently operational antennas; a revision or variant of software loaded in the base station; a status of a software license of the base station; at least one of a product name, a unit identity, brand or company name, logotype, bar code, product number, or type approval associated with the base station. The base station state may indicate a hardware fault of the base station or a specific base station component and/or include information as how to or where to install the base station component.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above. The division of memory between data and programs in the description is for illustration purposes, but those skilled in the art appreciate that the interpretation of memory as program instructions or data is context-related, and that in some embodiments, the same information may comprise both instruction and data.

Figure 1:
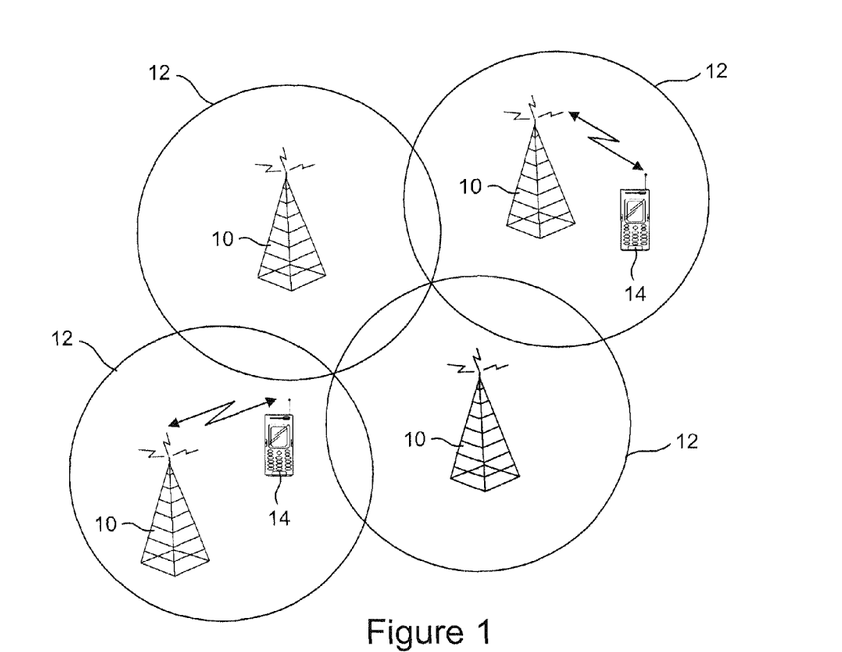
FIG. 1 illustrates an example of a cellular communications system in which radio base stations provide radio coverage for radio user equipments (UEs)

FIG. 1 illustrates an example of a cellular communications system in which radio base stations 10 provide radio coverage for radio user equipments (UEs) 14 in cell coverage areas 12. The radio base stations 10 and the UEs 14 communicate over a radio interface using one or more radio access technologies, non-limiting examples of which are time division multiple access (TDMA) such as is used in the 2G GSM system, code division multiple access (CDMA) such as is used in the 3G UMTS system, orthogonal frequency division multiple access (OFDMA) such as is used in 4G LTE, WiMAX, etc. The base stations may communicate with each other and also communicate with other networks like the Internet, public and private telephone networks, etc.

Figure 2:
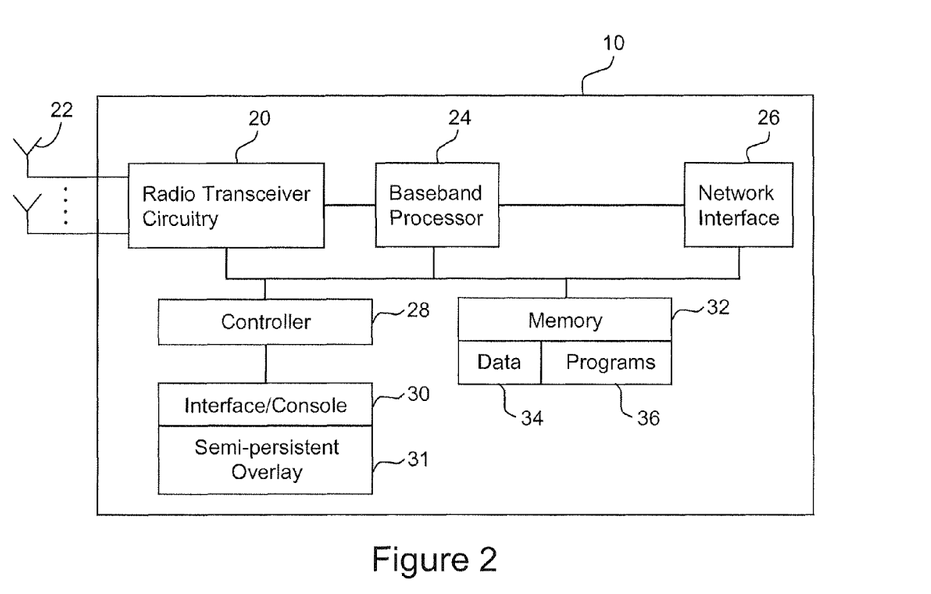
FIG. 2 illustrates a function block diagram of a radio base station.

FIG. 2 illustrates a function block diagram of a radio base station 10 that includes radio transceiver circuitry 20 (typically multiple radio transceivers) coupled to one or more antennas 22 and to a baseband signal processor 24. A network interface 26 interfaces the baseband processor with other network elements. A human-readable, semi-persistent overlay 31 is provided on the surface of an interface/console 30. A controller 28 is coupled to monitor and/or control a semi-persistent memory 32, the interface/console 30, the human-readable, semi-persistent overlay 31, the radio transceiver 20, the baseband processor 24, and network interface 26. An operational state associated with the base station is stored in program portion 36 of semi-persistent memory 32. A configuration state is stored in data portion 35 of semi-persistent memory 32. Hence, the program portion 36 of the semi-persistent memory 32 stores programs for the controller, and the data portion 35 of semi-persistent memory 32 stores configuration data used by the controller to control the base station to perform various base station operations and to control the status of the human-readable, semi-persistent overlay 31 in accordance with a current operational state or configuration state associated with the base station, which includes the current operational state and one or more configuration state associated with any unit or sub-unit of the base station.

One example of an RBS operational state is the RBS's or RBS sub-unit's fundamental function and changing that operational state involves a major change of program portion 36, e.g., changing from GSM software to LTE software. Adding one or more new functions is another example of operational state change. Often, operational state changes require a restart of one or more parts of the RBS. A new or changed operational state for an RBS can result from a software upgrade and/or a different software release, which typically requires strict procedures including formal documentation of the software product and its compliance with relevant standards and/or legal requirements. A software product is associated with a name and a revision and when implemented on a generic base station provides a specifically configured base station. In this way, different base stations can be created by loading a generic base station or base station unit with different operational states, which in the example here are in the form of different software products. Configuration states for an RBS are defined by the current operational state, i.e., what options the software allows, and configuration state, i.e., which option selected, associated with the RBS. An example configuration state change is a change in one or more software parameters such as reconfiguring a transport network connector from an ATM connector to an Ethernet connector.

Returning to FIG. 2, the controllable, human-readable, semi-persistent overlay 31 replaces traditional "printed" text on a radio base station 10. The text and/or symbols on the human-readable, semi-persistent overlay 31 have similar persistence as printed text, and the controller 28 can change the persistent text and/or symbols either based on received remote control commands or based on locally-generated commands. The persistent text and/or symbols correspond to a persistent current operational state and may also correspond to a persistent configuration state associated with the radio base station 10, its connectors, indicators, or other operational characteristics such as product identity and revision for the base station as defined by the operational state, radio access technologies (e.g., GSM/LTE/WCDMA/CDMA/TD-SCDMA) currently supported or configured to communicate with, specific information identifying what to connect to each connector, what each button does, and what each indicator means, a current antenna configuration, which may include specific information about antenna direction, antenna branch, and frequency band for each cable/antenna to be connected to the connector, etc. Persistent means that the overlay text and/or symbols (also referred to as persistent print) remain visible and the current radio base station state remains unless it is actively changed.

Figure 3A:
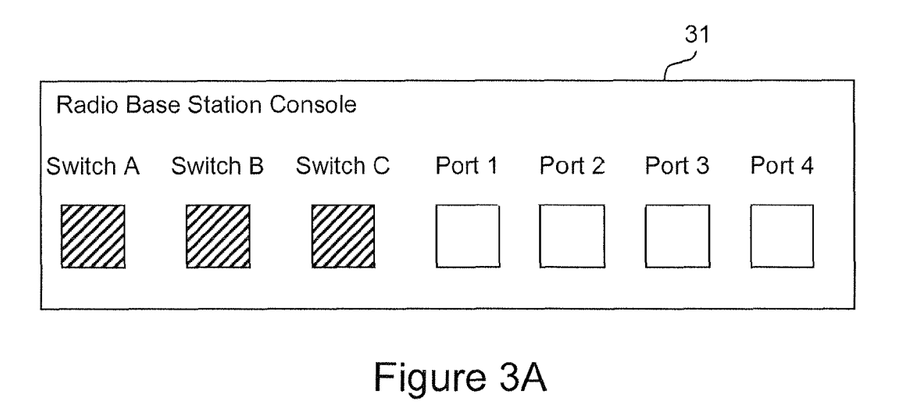
FIG. 3A illustrates an example of a generic base station console that includes a changeable or reconfigureable, semi-persistent overlay in a first generic state.

FIG. 3A shows a front view of an example base station sub-unit with a semi-persistent overlay associated with base station buttons shown as cross-hatched boxes and base station connectors shown as blank boxes. An RBS may include a single sub-unit or plural sub-units connected to each other with cables or other connection mechanisms. Each RBS sub-unit may have its own semi-persistent overlay with relevant information for the RBS sub-unit and/or RBS. In FIG. 3A, the semi-persistent overlay 31 affixed to the console 30 includes generic visible text and/or symbols associated with an operational state of the base station including Switches A-C and Ports 1-4. That state may be changed automatically using controller 28, and semi-persistent overlay 31 changes (changes in the visible text and/or symbols) reflect changes in an operational state or configuration state associated with the base station. For example, the generic switch ports A-C are configured in FIG. 3B as an on/off switch, a stop switch, and a fan switch. This first specific state of these example base station console switches is reflected in the text labels provided on the semi-persistent overlay 31 by the controller 28. The overlay's visible text and/or symbols is/are semi-persistent, which means that the current overlay text and/or symbols remains visible and unchanged even if the base station is powered off. The current state or configuration is preferably stored in semi-persistent memory 32 to achieve the same benefit. The connectors generically labeled as ports 1-4 are also now configured in FIG. 3B to be a transport network connector (TN), a common public radio interface (CPRI) connector (towards the radio transceivers), an interconnect cable to another unit in the RBS and a local control port (for a site engineer's laptop to monitor/configure the RBS), respectively, in FIG. 3B. A management terminal, for example, may have changed one or more functions of the unit by changing the operational state or configuration state of the connectors (e.g., switches and ports). The semi-persistent overlay displays the current visible state based on the current operational state independently of power and/or availability of a controller.

Figure 4:
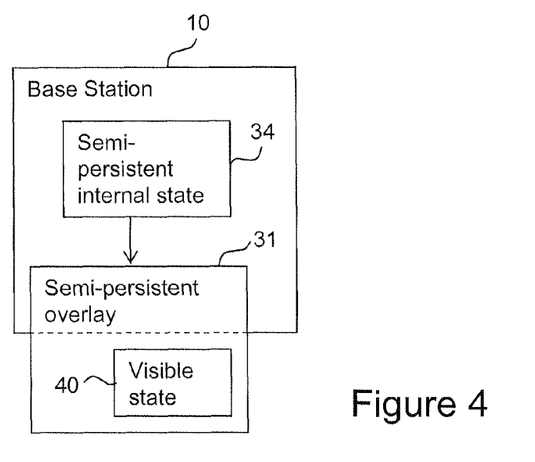
FIG. 4 is a non-limiting function block diagram of a first example embodiment of a generic base station with a semi-persistent overlay that visibly displays the current state associated with the base station.

FIG. 4 is a function block diagram of a first non-limiting, example embodiment of a base station 10 with a semi-persistent overlay 31 that visibly displays the current operational state 34 of the base station 10 as a visible state 40. The operational state 34 is further detailed in FIG. 2 as including both an operational state and a configuration state combination stored in semi-persistent memory 32 as part of data 35 and/or a program 36. For simplicity, the shorter name "operational state" is used for 34, and its semi-persistence is implied since it is in semi-persistent memory 32. The display technology that provides the semi-persistent overlay 31 provides an image that is visible to the human eye and may only need power/energy when changing state. One non-limiting example display technology that may be used is a non-volatile electronic ink overlay with text and/or other characters/symbols that communicate certain information about the state of the base station 10. The non-volatility or persistence of the electronic ink overlay means that even though the electronic ink overlay behaves and is perceived like a traditional printed text overlay, unlike a traditional printed text overlay, the electronic ink overlay can be changed and updated. Moreover, if the base station powers off or breaks down, the overlay characters remain unchanged as of their state when the base station powers off or breaks down.

Electronic ink, electronic paper, e-paper, etc. display technologies (referred to herein as electronic ink technology) are known in general and are designed to mimic the appearance of ordinary ink on paper. Unlike conventional backlit flat panel displays, electronic paper displays reflect light like ordinary paper. The electronic ink technology can hold text and images indefinitely without using electricity, while allowing images to be changed later. Flexible electronic ink may use, for example, plastic substrates and plastic electronics for the display backplane. Non-limiting example electronic ink systems are described in U.S. patent publication 2008121246; U.S. Pat. No. 7,167,155; and U.S. Pat. No. 6,120,588, the contents of which are incorporated herein by reference.

Another example suitable semi-persistent overlay display technology is a mechanical display. A mechanical display typically flips dots using an electro-magnet. Although common for larger displays, mechanical displays may be reduced into sizes that are suitable for overlays by using micromechanical technology. Another example includes self-powered displays. Although such displays do need power to work, the power source is typically sufficient for the unit's life-span (e.g., a "10 year battery") or harvests energy (e.g., solar cells that give enough energy if the light is sufficient for a human eye to read the display as exists for pocket calculators and watches.)

Figure 5:
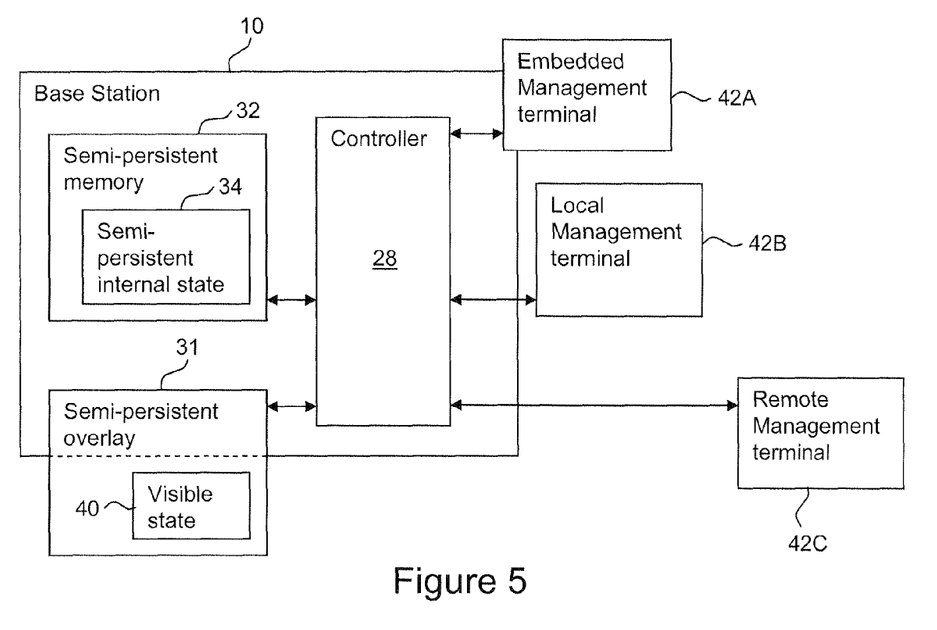
FIGS. 5-8 are function block diagrams of other example, non-limiting embodiments of a base station with a semi-persistent overlay that visibly displays the current state associated with the base station.

FIG. 5 is a function block diagram of other non-limiting, example embodiments of a base station 10 with a semi-persistent overlay 31 that visibly displays the current operational state 34 associated with the base station 10. The base station 10 includes a controller 28 coupled to a semi-persistent memory 32, e.g., non-volatile memory, that stores the current operational state 34 associated with the base station 10 and to the semi-persistent overlay 31 that displays the current visible state 40. A semi-persistent memory is a memory where stored information survives power-off, does not need external energy or activity to maintain itself in memory, and can be changed by a deliberate operation to write data. Well known state-of-art examples include Flash Memory, EEPROM, and magnetic storage like Hard Disk drives. It may also be a low power Random Access Memory (RAM) connected to a battery/capacitor/accumulator that maintains data for very long periods when the unit is powered off. The RAM may avoid accidental writes by using a write protection circuit, requiring an unlock command before accepting a write, etc.

The controller 28 also generates appropriate text/symbols/graphics on the semi-persistent overlay 31 tailored according to the current operational state 34 associated with the base station 10. The operational state 34 can represent for example a current configuration of the base station or base station (sub)unit. More generally, the operational state 34 encompasses data that influences the behavior and/or properties of the base station 10. The controller 28 may reference the operational state 34 to determine which program or part of program to execute and/or to determine a whether a port supports one kind of connector or a different kind of connector. A base station may have several operational states.

Figure 6:
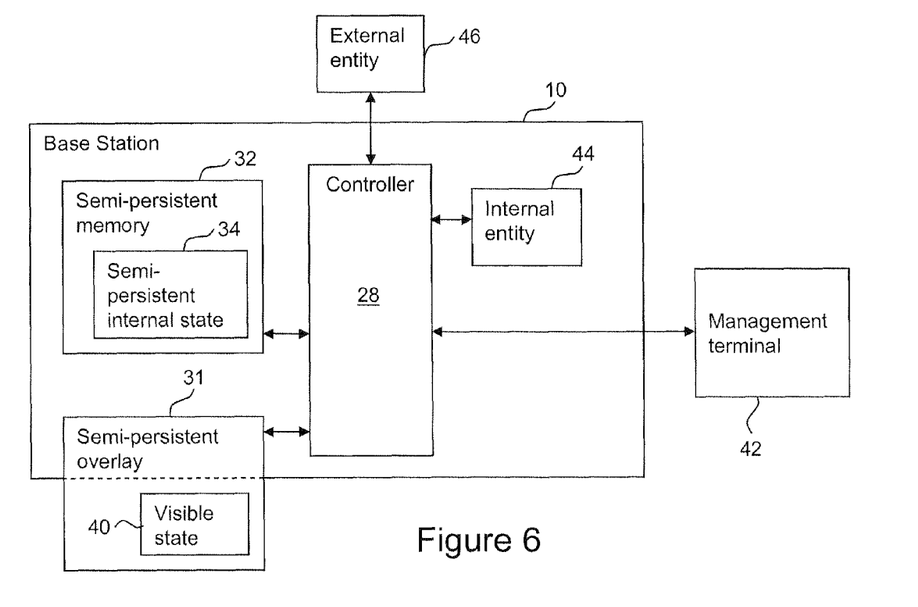

The operational state 34 may be modified by the controller 28 based upon one or more items from this non-exhaustive, example list: (1) a program or algorithm that is executed by the controller (e.g., computer software), (2) a status for one or more internal state(s) including the operational state that will be modified, (3) commands from a management terminal 42A-C as shown in FIG. 5, and/or (4) a status for an internal entity 44 or external entity 46 as shown in FIG. 6. Those skilled in the art appreciate that propagation of a state in one location (operational state 34) to another location (visible state 40) may fail for different reasons (for example base station restart, software crashes, or temporary hardware problems), hence requiring the controller 28 to use an appropriate method to ensure consistency between the operational state 34 and the visible state 40. Non-limiting example methods include journaling (set a flag in persistent memory that an update has started, perform the update, reset flag) and proofreading (check at regular interval and/or restart that visible state 40 matches operational state 34) and resolve any inconsistency found.

Figure 3B:
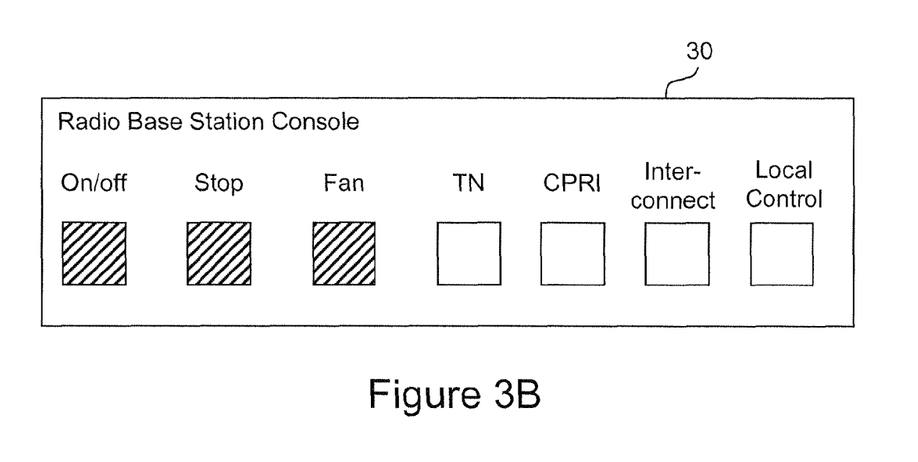
FIG. 3B illustrates an example of that generic base station having been configured to a second specific state reflected in the changed indications of the reconfigurable, semi-persistent overlay.

An operational state 34 may be maintained in any suitable fashion, but at a basic level includes some kind of memory that can store a value that represents one of plural states. There are several example ways to perform this. One is using a digital flip-flop, register, or memory cell. These are well known hardware components that store binary values. Another way is using a memory location or data register that stores multiple bits, e.g., "byte," "word," etc. These are known, low level abstractions in hardware and software for one or a group of memory cell(s) or digital flip-flop(s). Since more than one cell is used, it is possible to express a state that can be one of several values, e.g., 0, 1, 2, 3; red, blue, green, yellow, black; and TN, CPRI, Interconnect, Local Control as shown in FIG. 3B. A third way is by association—a high level software abstraction where the state is associated with a label or name rather than a fixed hardware location. Examples include a variable with the name "state_for_port_2" is assigned the value "monitor" by the command "state_for_port_2:=monitor," a file on a computer file system where the state is stored as a value (1, 2, Red) or an association (state_42="Red"). This technique may be used for example for semi-permanently storing data on flash memories and disk drives. The data is preserved in the flash memory or on the disk, but the data is copied into working memory when needed.

Returning to FIG. 5, a management terminal 42 is a control interface that can be operated by a human (by entering commands or by other man-machine-interface interactions like mouse clicks, etc.) or by a computer running a software program. Three different example locations (42A, 42B, and 42C) are shown for a control interface. All combinations are possible, but such a terminal itself is optional. One example is an embedded terminal 42A that is a part of the base station 10. It can be as simple as a button on the base station, but it can also be a computer terminal fixed to the base station. Another example is a local terminal 42B which is at the same location as the base station 10, but not an integrated part of the base station 10. For example, a service engineer brings a management terminal 42B to the base station, connects them together to change some state, and then removes it. Still another variant is locating the terminal the same area as the base station but physically separated from the base station. Finally, the terminal 42C may be remotely located relatively far away from the base station, e.g., at a control node that controls several base stations. Remote management is typically more convenient. The controller 28 may communicate with local management terminal 42B and/or remote management terminal 44C using any suitable medium (wire, wireless, optical, etc.) using any suitable communications format/protocol.

The controller 28 may receive information and/or requests from the terminal(s) 42. For example, a terminal 42 can order the controller 28 to read and/or report the operational state 34 of the base station 10 and also modify that operational state 34 of the base station, e.g., reconfigure, reprogram, change some feature, add a feature, etc. But a terminal 42 can only communicate with the controller 28 when the base station 10 is powered-on. Hence, the current operational state 34 of the base station 10 can only be viewed by a terminal 42 when the base station 10 is powered-on and connected to or a communication link is established with the terminal.

In contrast, the visible state 40 shown on the semi-persistent overlay 31 is maintained independent of power and/or availability of the controller 28. By providing the current operational state of the base station via the semi-persistent overlay 31 even when the base station 10 is powered-off and/or is physically moved to a new location, e.g., for repair or reuse, a human operator can still readily discern the current configuration of the base station and/or its connectors. In addition to the visible state 40 of the semi-persistent overlay 31 presenting the current mode of operation and operational state 34 configuration in a format easily readable by humans at all stages in a servicing process, it can also indicate if the base station 10 is declared faulty, and if desired, an underlying reason for the decision.

The non-limiting example embodiment of FIG. 6 shows an external entity 46 and/or an internal entity 44 coupled to the controller 28. The entities might for example represent base station sub-units or sensors, which can result in the base station's controller 28 changing the operational state 34. An example application includes a situation where some part of the base station's hardware is broken and needs replacement. This event is detected by an entity and reflects a change in the operational state 34. The controller 28 may report the event to a management terminal 42. Another example application includes a situation where another unit, supervised by the base station, is broken.

Figure 7:
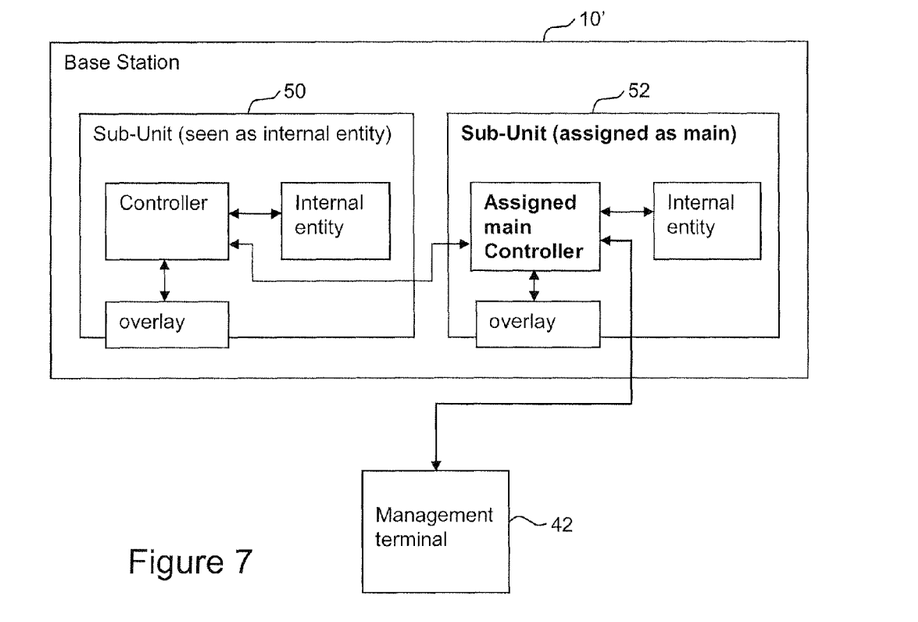
Figure 8:
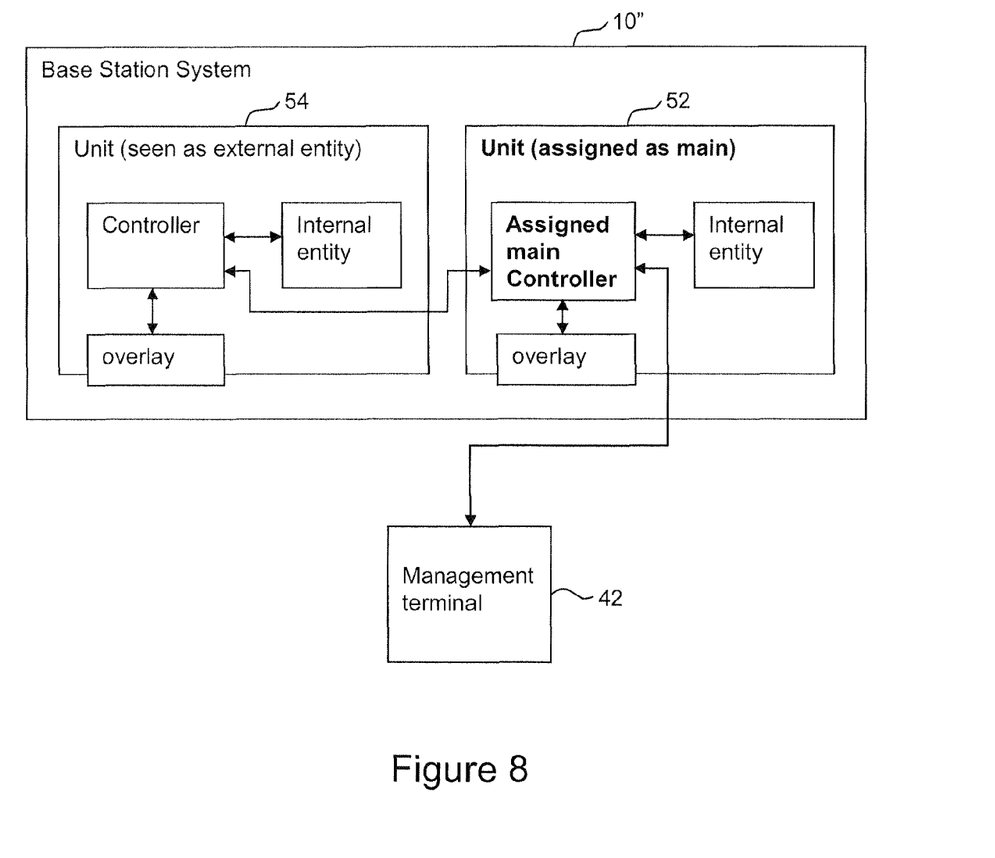

Other configurations are applicable. FIG. 7 shows a non-limiting example embodiment of a single base station 10' that includes a number of sub-units 50 and 52. One sub-unit 52 is assigned the role as main controller and reports to a management terminal 42. For this example, the other sub-unit 50 is seen as an internal entity. FIG. 8 shows another non-limiting example embodiment with the same "blocks" as FIG. 7 but with the unit block renamed to base station system 10", and the sub-unit blocks renamed as units. The same "block" 52 is a main controller, but now the other "block" is seen as an external entity 54.

Figure 9:
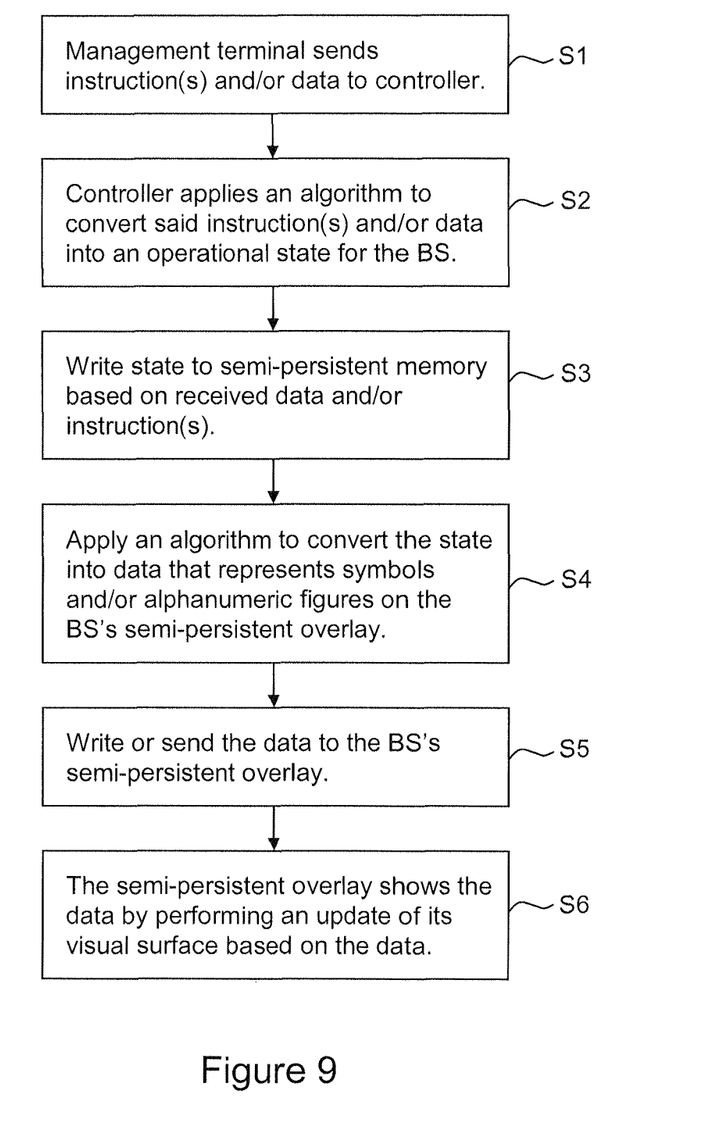
FIG. 9 is a flowchart illustrating procedures in accordance with one non-limiting, example embodiment for updating a current state associated with a base station and displaying that current state on a semi-persistent overlay.

FIG. 9 is a flowchart illustrating procedures in accordance with a non-limiting, example embodiment for updating a current operational state of a base station and displaying that current state on the base station's semi-persistent overlay. A management terminal 42 sends an instruction, e.g., a command like "Start" entered by a human operator, or some kind of data, e.g., a data packet, to the internal controller 28 (step S1). The instruction or reception of data triggers a state change in the base station 10. The controller 28 applies an algorithm that decides if/how the base station's operational state 34 is to be changed (step S2). For this flowchart, it is assumed that the state changes, but many implementations will include instructions that do not result in an operational state 34 change. One example of implementing an algorithm is a computer executing a computer program. Another example is the controller 28 being implemented as a state machine such a digital circuit rather than a programmed computer or as a neural network which is trained rather than programmed. The controller 28 stores the base station operational state 34 in the semi-persistent memory 32 (step S3). The controller 28 applies an algorithm to generate data that will appear as graphics and/or alphanumeric symbols (e.g., icons, text boxes, etc.) on the semi-persistent overlay (step S4). The controller 28 transfers the data to the semi-persistent overlay 31 (step S5), and the semi-persistent overlay 31 performs an operation that changes the semi-persistent overlay in order to show a visible state 40 reflecting the changed state associated with the base station 10 (step S6).

Figure 10:
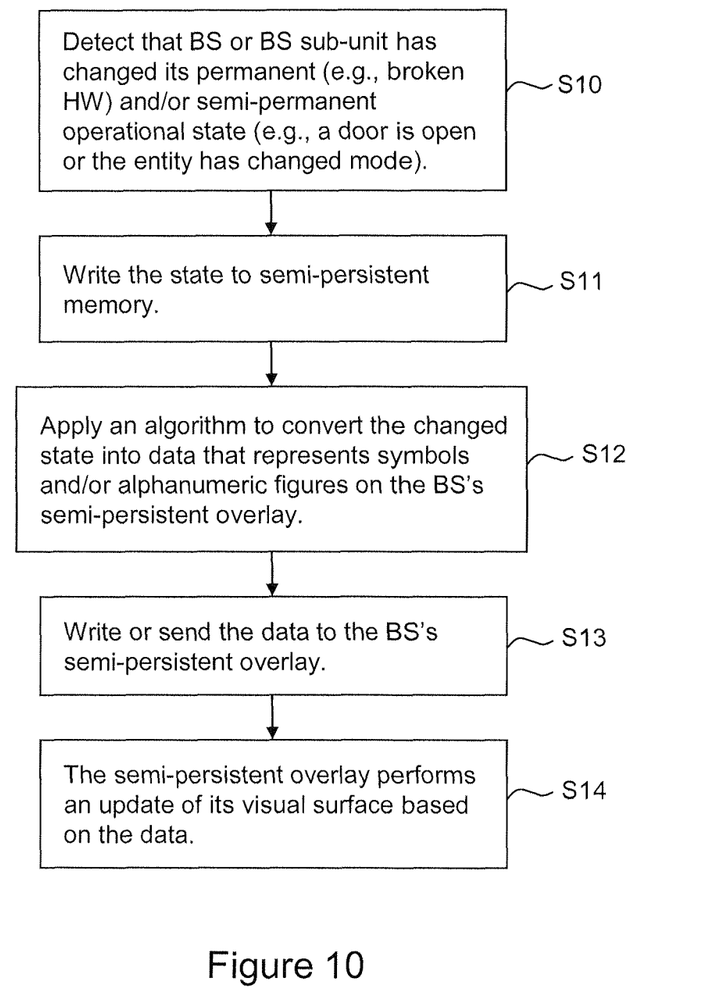
FIG. 10 is a flowchart illustrating procedures in accordance with a non-limiting, example embodiment for updating a current state associated with the base station and displaying that current state on a semi-persistent overlay.

FIG. 10 is a flowchart illustrating procedures in accordance with a non-limiting, example embodiment for updating a current operational state 34 of a base station 10 and displaying that current state as a visible state 40 on the base station's semi-persistent overlay 31. Here, a change of the base station's operational state 34 and the corresponding change of the semi-persistent overlay 31 are triggered locally. Initially, the controller 28 detects that the base station or a base station sub-unit has changed its permanent (e.g., broken hardware (HW)) and/or semi-permanent operational state (e.g., a door is open or the entity has changed mode) (step S10). The controller 28 writes the operational state to semi-persistent memory (step S11). The controller 28 then applies an algorithm to convert the changed state into data that represents symbols and/or alphanumeric figures (visible state 40) on the BS's semi-persistent overlay 31 (step S12). The controller 28 writes or sends the data to the BS's semi-persistent overlay 31 (step S13), and the semi-persistent overlay 31 performs an update of its visual surface 40 based on the data (step S14).

The semi-persistent overlay 31 may be used to show a base station's brand name, logotype, product name, product number, and bar code (EAN or other) along with indicating what the base station's current configuration. Moreover, the semi-persistent overlay 31 may be used to show a location for the base station, e.g., a slot where a base station sub-unit should be fitted and/or a building map showing where the base station is to be installed. The semi-persistent overlay 31 may also be used to label connectors on the base station to indicate how cables should be connected to operate the base station in its current configuration. In addition, the mode of operation of the base station may be indicated on the semi-persistent overlay 31 along with other helpful information that simplifies work and/or reduces the risk of human errors.

Because the operational state of base stations is often software related, the semi-persistent overlay 31 can indicate revision/variant/production ID information. If a software upgrade changes one or more hardware properties of the base station, the semi-persistent overlay may be used to visibly label the base station with a number/logo/identity that corresponds to an approval or conformity declaration for the new configuration.

Some features of a base station may require a license to activate. For example, a current configuration of a radio transmitter in the radio transceiver 20 may only support a 20 W output even though higher power output is possible, e.g., 40 W or 60 W, if a license is obtained. Here, a semi-persistent overlay 31 on relevant unit(s) of the radio base station can show what power outputs are available by presenting the possible powers and license information on the outside of the base station, e.g., on each transmitter unit and/or on a control unit.

In another example embodiment, the semi-persistent overlay 31 adapts to physical orientation of the base station using for example a gravity sensor connected to the controller 28. That way the text/graphics for the visible state 40 on the semi-persistent overlay 31 can be reoriented to make reading easier according to whether the base station 10 is oriented horizontally or vertically. This is useful when RBS include sub-unit slots in both horizontal and vertical directions.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a radio base station that performs one or more radio communication functions and includes a human-readable, semi-persistent overlay fixed to a surface of the radio base station, comprising:
    storing in nonvolatile memory of the radio base station a current operational state associated with the radio base station, the current operational state including a first radio base station configuration;
    indicating at least with text characters or symbols on the human-readable, semi-persistent overlay the current state associated with the radio base station;
    changing the current operational state of the radio base station, the changed operational state including a second radio base station configuration different from the first radio base station configuration;
    updating the text characters or symbols on the human-readable, semi-persistent overlay to reflect the changed operational state associated with the radio base station; and
    maintaining the indication of the changed operational state on the human-readable, semi-persistent overlay, which is human-readable even if the radio base station is powered-down.

2. The method in claim 1, further comprising performing the maintaining when a previous attempt to change the indication of the current operational state associated with the radio base station fails.

3. The method in claim 1, further comprising:
    receiving the changed current operational state from a local management terminal or a remote management terminal in communication with the radio base station.

4. The method in claim 1, further comprising:
    receiving the changed current operational state from an external entity or an internal entity.

5. The method in claim 1, wherein the operational state relates to a connector, button, knob, or port of the radio base station.

6. The method in claim 1, wherein the operational state relates to a revision or variant of software loaded in the radio base station.

7. The method in claim 1, wherein the operational state relates to a status of a software license of the radio base station.

8. The method in claim 1, wherein the operational state relates to at least one of a product name, a radio base station identity, brand or company name, logotype, bar code, product number, or type approval.

9. The method in claim 1, wherein the operational state indicates a hardware fault of the radio base station.

10. The method in claim 1, wherein the operational state includes information as how to or where to install the radio base station or radio base station sub-unit.

11. The method in claim 1, wherein the human-readable, semi-persistent overlay is a non-volatile electronic ink overlay.

12. A radio base station for performing one or more radio communication functions radio communications with multiple radio user equipments, comprising:
    radio transceiving circuitry configured to enable radio communications with multiple radio user equipments;
    a nonvolatile memory configured to store a current operational state associated with the radio base station;
    a human-readable, semi-persistent overlay fixed to a surface of the radio base station configured to indicate semi-persistently at least with text characters or symbols the current operational state associated with the radio base station; and
    a controller, coupled to the radio transceiving circuitry, the nonvolatile memory, and the human-readable, semi-persistent overlay, configured to change the current operational state associated with the radio base station and to update the text characters or symbols on the human-readable, semi-persistent overlay to reflect the changed operational state associated with the radio base station,
    wherein the human-readable, semi-persistent overlay is configured to maintain the indication of the changed operational state, which is human-readable even if the radio base station is powered-down.

13. The radio base station in claim 12, wherein the human-readable, semi-persistent overlay is configured to maintain the indication of the changed state when a previous attempt to change the indication of the current operational state associated with the radio base station fails.

14. The radio base station in claim 12, wherein the controller is configured to receive the changed current operational state from a local management terminal or a remote management terminal in communication with the radio base station.

15. The radio base station in claim 12, wherein the operational state relates to a connector, button, knob, or port of the radio base station.

16. The radio base station in claim 12, wherein the operational state relates to a revision or variant of software loaded in the radio base station.

17. The radio base station in claim 12, wherein the operational state relates to at least one of a product name, a radio base station identity, brand or company name, logotype, bar code, product number, or type approval.

18. The radio base station in claim 12, wherein the operational state indicates a hardware fault of the radio base station.

19. The radio base station in claim 12, wherein the operational state includes information as how to or where to install the radio base station or radio base station sub-unit.

20. The radio base station in claim 12, wherein the human-readable, semi-persistent overlay is a non-volatile electronic ink overlay.

* * * * *